(12) United States Patent
Yu et al.

(10) Patent No.: US 10,305,620 B2
(45) Date of Patent: May 28, 2019

(54) METHOD AND APPARATUSES FOR ALGORITHM ON QAM COHERENT OPTICAL DETECTION

(71) Applicant: ZTE (USA) INC., Austin, TX (US)

(72) Inventors: Jianjun Yu, Princeton, NJ (US); Jin Tang, Morristown, NJ (US)

(73) Assignee: ZTE (USA) Inc., Richardson, TX (US)

( * ) Notice: Subject to any disclaimer, the term of this patent is extended or adjusted under 35 U.S.C. 154(b) by 694 days.

(21) Appl. No.: 14/268,739

(22) Filed: May 2, 2014

(65) Prior Publication Data

US 2014/0341236 A1 Nov. 20, 2014

Related U.S. Application Data

(60) Provisional application No. 61/818,985, filed on May 3, 2013.

(51) Int. Cl.
*H04L 12/28* (2006.01)
*H04J 14/06* (2006.01)
(Continued)

(52) U.S. Cl.
CPC ............ *H04J 14/06* (2013.01); *H04B 10/532* (2013.01); *H04B 10/541* (2013.01);
(Continued)

(58) Field of Classification Search
CPC .................................................. H04B 10/2575
(Continued)

(56) References Cited

U.S. PATENT DOCUMENTS 6,396,876 B1 * 5/2002 Babonneau ............. G06T 5/002
348/620
6,700,923 B1 * 3/2004 Dowling .............. H04B 1/7105
375/148

(Continued)

OTHER PUBLICATIONS

Aapo Hyvarinen, Juha Karhunen & Erkki Oja, Independent Component Analysis, 2001, John Wiley & Sons, Inc., pp. 63, 74, 221-227, 293-294. (Year: 2001).*

*Primary Examiner* — Farah Faroul
(74) *Attorney, Agent, or Firm* — Drinker Biddle & Reath LLP

(57) ABSTRACT

Blind polarization demultiplexing algorithms based on complex independent component analysis (ICA) by negentropy maximization for quadrature amplitude modulation (QAM) coherent optical systems are disclosed. The polarization demultiplexing is achieved by maximizing the signal's non-Gaussianity measured by the information theoretic quantity of negentropy. An adaptive gradient optimization algorithm and a Quasi-Newton algorithm with accelerated convergence are employed to maximize the negentropy. Certain approximate nonlinear functions can be substitutes for the negentropy which is strictly derived from the probability density function (PDF) of the received noisy QAM signal with phase noise, and this reduces the computational complexity. The numerical simulation and experimental results of polarization division multiplexing (PDM)-quadrature phase shift keying (QPSK) and PDM-16QAM reveal that the ICA demultiplexing algorithms are feasible and effective in coherent systems and the simplified ones can also achieve equivalent performance.

15 Claims, 11 Drawing Sheets

(51) Int. Cl.
*H04B 10/532* (2013.01)
*H04B 10/54* (2013.01)
*H04L 27/22* (2006.01)
*H04L 27/227* (2006.01)
*H04L 27/38* (2006.01)

(52) U.S. Cl.
CPC .......... *H04L 27/223* (2013.01); *H04L 27/227* (2013.01); *H04L 27/3818* (2013.01)

(58) Field of Classification Search
USPC .......... 370/203, 204, 206, 499, 536; 398/65, 398/149
See application file for complete search history.

(56) References Cited

U.S. PATENT DOCUMENTS

| | | | | |
|---|---|---|---|---|
| 6,757,423 B1* | 6/2004 | Amini | ................ | G06T 7/2033 382/128 |
| 6,915,321 B2* | 7/2005 | Walster | ................ | G06F 17/11 708/446 |
| 7,301,997 B1* | 11/2007 | Wang | ................ | H04B 10/6971 333/18 |
| 8,199,851 B1* | 6/2012 | Dybdal | ................ | H01Q 21/26 342/188 |
| 9,047,867 B2* | 6/2015 | Smaragdis | ............ | G10L 15/142 |
| 2002/0136328 A1* | 9/2002 | Shimizu | ............ | H04L 25/03165 375/316 |
| 2003/0043929 A1* | 3/2003 | Sampath | ............... | H04B 7/0417 375/267 |
| 2003/0099295 A1* | 5/2003 | Averbuch | ................ | G06T 7/269 375/240.16 |
| 2005/0100105 A1* | 5/2005 | Jensen | ................ | H04L 27/368 375/259 |
| 2005/0175353 A1* | 8/2005 | Morgan | ............ | H04B 10/2569 398/149 |
| 2008/0260015 A1* | 10/2008 | Wang | ................ | H04B 10/6971 375/232 |
| 2010/0165364 A1* | 7/2010 | Qiao | ..................... | H04N 1/603 358/1.9 |
| 2011/0075916 A1* | 3/2011 | Knothe | ............. | G06K 9/00201 382/154 |
| 2011/0206385 A1* | 8/2011 | Chen | ..................... | H04B 10/60 398/208 |
| 2013/0156222 A1* | 6/2013 | Lee | ....................... | H04R 3/005 381/93 |
| 2013/0290223 A1* | 10/2013 | Chapelle | ................ | G06F 15/18 706/12 |
| 2013/0294611 A1* | 11/2013 | Yoo | ...................... | G10L 21/028 381/66 |
| 2014/0355776 A1* | 12/2014 | Park | .................... | G10L 21/0208 381/71.2 |
| 2014/0362120 A1* | 12/2014 | Wohl | ................... | G06T 11/206 345/661 |
| 2015/0286785 A1* | 10/2015 | Hielscher | ............ | A61B 5/0073 382/131 |
| 2018/0197089 A1* | 7/2018 | Krasser | ..................... | G06N 5/04 |

* cited by examiner

METHOD AND APPARATUSES FOR ALGORITHM ON QAM COHERENT OPTICAL DETECTION

RELATED APPLICATIONS

This Application claims the benefit of U.S. Provisional Application 61/818,985 filed on May 3, 2013, the entirety of which is incorporated herein by reference.

BACKGROUND OF THE INVENTION

The coherent optical communication systems which employ polarization division multiplexing (PDM) are promising and excellent solutions for high capacity and spectral-efficient communication. The PDM scheme can simply double the transmission rate by utilizing both polarization-orthogonal tributaries at the identical wavelength as multiplexing paths in the fiber. The availability of coherent optical receivers with PDM has been validated by plenty of high capacity experiments [1-5]. Despite of its attractive benefit, there are unavoidable problems in the implementation of the PDM method. The main problematic issue is the crosstalk of the two paths due to the random polarization state variation and polarization mode dispersion (PMD). In order to successfully recover the transmitted data, polarization demultiplexing in optical domain [6-8] or electrical domain [9-11] is needed to separate the mixed signals. In a digital coherent receiver, digital signal processing (DSP) techniques can be employed for polarization demultiplexing. The blind constant modulus algorithm (CMA) and its variants [12-17] are most commonly used, but they are not specially designed for the polarization demultiplexing purpose and might cause the singularity problem [18] of "converge to the same source", implying that the demultiplexing techniques need to be improved. Supervised adaptive least mean square (LMS) algorithm [19] and single carrier frequency domain equalization (SC-FDE) [20] methods, which require training sequence, can also be implemented. However, they are primarily for channel equalization and behave analogously as CMA in polarization demultiplexing.

Independent component analysis (ICA) was originally proposed for the blind signal separation (BSS) problems, but now it has been developed into broad applications such as voice separation, image processing, bioinformatics, etc. Though widely used in signal processing, its applications in optical communication sphere are rare. Polarization demultiplexing based on ICA method has been explored through maximum likelihood estimation [21-22], in which a gradient optimization algorithm is used with the criterion strictly matching the probability density function (PDF). An approach based on signal higher order statistics makes the ICA demultiplexing algorithm independent of modulation format [23]. There is another ICA method exploiting the magnitude boundedness of digital signal for low symbol rate case [24] and high symbol rate case [25]. The ability of separating the mixed signal components further suggests the potential application of ICA in the newest spatial-division multiplexing technology [26].

BRIEF SUMMARY OF THE INVENTION

In this application, we derive a complex-value ICA algorithm by negentropy maximization originally proposed by Tülay Adali [27-28] for the purpose of polarization demultiplexing in actual fiber optic communication systems and verify it by numerical simulation and experiment. The result shows that the demultiplexing algorithm based on ICA is effective and its computation complexity can be decreased without performance deterioration.

The demultiplexing problem will be described and the fiber PDM channel will be analyzed. The proposed ICA algorithms and their simplifications will be stated in detail. The convergence, stability and the performance in the PMD emulator will be analyzed and the experimental results will be presented.

DETAILED DESCRIPTION OF THE INVENTION

Problem Description and PDM Channel Model

Figure 1:
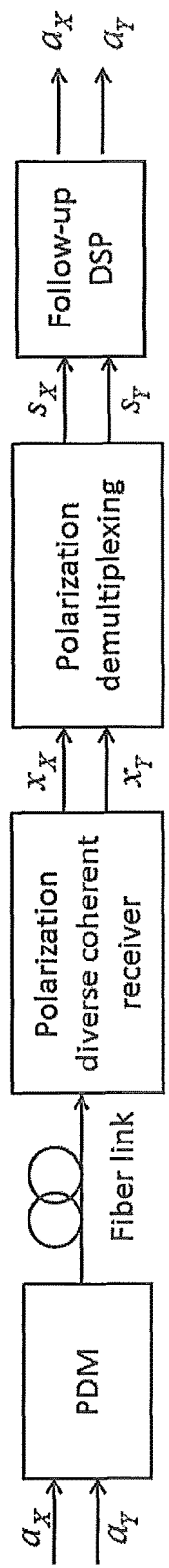
FIG. 1 is an overall diagram of a coherent PDM system.

As shown in FIG. 1, in a PDM system, independent and identically distributed complex signal $a=[a_X, a_Y]^T$ in QAM format is transmitted over both polarization tributaries of fiber. At the receiver, these signals are polarization-split and frequency down-converted by a polarization-diverse coherent receiver in order to extract the in-phase and quadrature components in two orthogonal polarizations of the received signal.

As noted in [21], a is affected by the time-variant phase noise and frequency offset of the lasers at optical transceivers, and also affected by Erbium doped fiber amplifier (EDFA) generated amplified spontaneous emission (ASE) noise in the fiber link, which can be viewed as white Gaussian noise. So the independent components which the ICA algorithms pursue can be expressed as $s_K = (a_K + n_K) e^{j\phi_K}$ (K=X or Y), where $\phi_K$ is the interference due to the signal phase and is complex Gaussian noise. Additional carrier recovery process is needed to eliminate the ill effects of $\phi_K$ after applying the polarization demultiplexing method.

We assume that chromatic dispersion (CD) has been completely compensated in this paper, since stationary CD can be compensated by a fixed digital equalizer using frequency-domain or time-domain truncation method [15].

PMD is the most indispensable factor to be considered in designing optical PDM communication systems. In theory, PMD is mathematically modeled as a concatenation of birefringence fiber segments with arbitrary rotations around their principal axes and stochastic differential group delay (DGD) of Maxwellian distribution. The Jones transformation matrix can be written as:

$$H(\omega) = \prod_{i=1}^{n} P_i(\omega) S_i \quad (1)$$

Here, $P_i(\omega)$ is the ith section's delay matrix, and $S_i$ is the ith scattering matrix:

$$P_i(\omega) = \begin{bmatrix} e^{j\omega\Delta\tau_i/2} & 0 \\ 0 & e^{-j\omega\Delta\tau_i/2} \end{bmatrix} \quad (2)$$

$$P_i(\omega) = \begin{bmatrix} e^{j\omega\Delta\tau_i/2} & 0 \\ 0 & e^{-j\omega\Delta\tau_i/2} \end{bmatrix} \quad (3)$$

where $\omega$ is the angular frequency, $\Delta\tau_i$ is the DGD value of the ith section, $\theta_i$ and $\varphi_i$, uniformly distributed in $[0,2\pi)$, respectively denote the frequency-independent random rotation and phase shift of principal axes [29], so that the corresponding PMD vectors would cover the whole Poincaré sphere. In all, $H(\omega)$ in (1) is a frequency-dependent unitary matrix:

$$H(\omega) = \begin{bmatrix} H_1(\omega) & H_2(\omega) \\ -H_2^*(\omega) & H_1^*(\omega) \end{bmatrix}, (\omega \in [0, 2\pi)) \quad (4)$$

and $|H_1(\omega)|^2 + |H_2(\omega)|^2 = 1$. Due to the frequency-dependent nature of PMD, PDM transmission channel model should be accurately described as a 2×2 multiple-input multiple-output (MIMO)-finite impulse response (FIR) structure. Thus the received signal $x = [x_X, x_Y]^T$ is a mixed and distorted version of $s = [s_X, s_Y]^T$, which also means that the polarization demultiplexing algorithms should be, in principle, capable of dealing with convolutional mixing. However, considering the fact that the $1^{st}$-order PMD value of fiber link is relatively low in many practical scenarios and adaptive equalizers are usually employed for PMD compensation [15] in the following DSP processing, when CD has been well compensated previously, the mixing channel can be simplified as an instantaneous matrix in a short period of time. As was done in [21-23], ignoring the frequency-selective nature of $H(\omega)$, we express the mixing matrix as $$H(\theta, \varphi) = \begin{bmatrix} \cos\theta & \sin\theta e^{j\varphi} \\ -\sin\theta e^{-j\omega} & \cos\theta \end{bmatrix} \quad (5)$$

where $\theta$ and $\varphi$ are the parameters to be estimated by ICA algorithm discussed below.

Based on the FIG. 1, the mixing matrix links the independent components and mixed signal, namely x=Hs. The goal of ICA demultiplexing algorithm is to seek a matrix W which is the best estimation of $H^{-1}$, so that the independent components can be obtained from y=Wx. Because the polarization state of fiber is time-varying and usually unstable, the separation method has to be adaptive. The applicability of ICA demultiplexing algorithm depends on its performance, robustness and computational complexity.

Complex ICA Algorithm Detection

A. The Principle and Cost Function

According to the central limit theorem, a classical result in probability theory, the statistics of a mixed signal tends to be more Gaussian than its independent components under certain conditions. As noted by A. Hyvärinen [30], "Non-Gaussian is independent." Thus, ICA is to maximize the non-Gaussianity of $y=w^H x$, where w is one of the column vectors in W. Non-Gaussianity can be measured by negentropy which is based on the information theoretic quantity of differential entropy [30]. The negentropy of a complex value y can be defined as [27]

$$J_{neg} = H(y_{Gauss}) - H(y) \quad (6)$$
$$= const - H(y)$$

where $y_{Gauss}$ is a complex Gauss variable of the same variance as y, H is the differential entropy defined as $$H(y) = E\{\log[p(y)]\} \quad (7)$$
$$= -\int p(y)\log p(y)dy$$
$$= -\int\int p(y^R, y^I)\log p(y^R, y^I)dy^R dy^I$$

and $p(y)=p(y^R,y^I)$ is joint PDF of complex variance y. It can be proved in information theory that a Gauss variable has the largest entropy among all random variables of equal variance, so negentropy is always positive and is zero if and only if y is Gauss. Since $H(y_{Gauss})$ is constant, maximizing the non-Gaussianity of y is equivalent to minimizing the bivariate differential entropy in (7). Therefore, when using negentropy as a criterion of non-Gaussianity, the optimal cost function is $$J(w) = E\{-\log [p_s(w^H x)]\} \quad (8)$$

where $p_s$ is the PDF of $s_K$ (K=X or Y). In practice, expectation operator E in (8) is usually replaced by an arithmetic average or instantaneous value.

Figure 2:
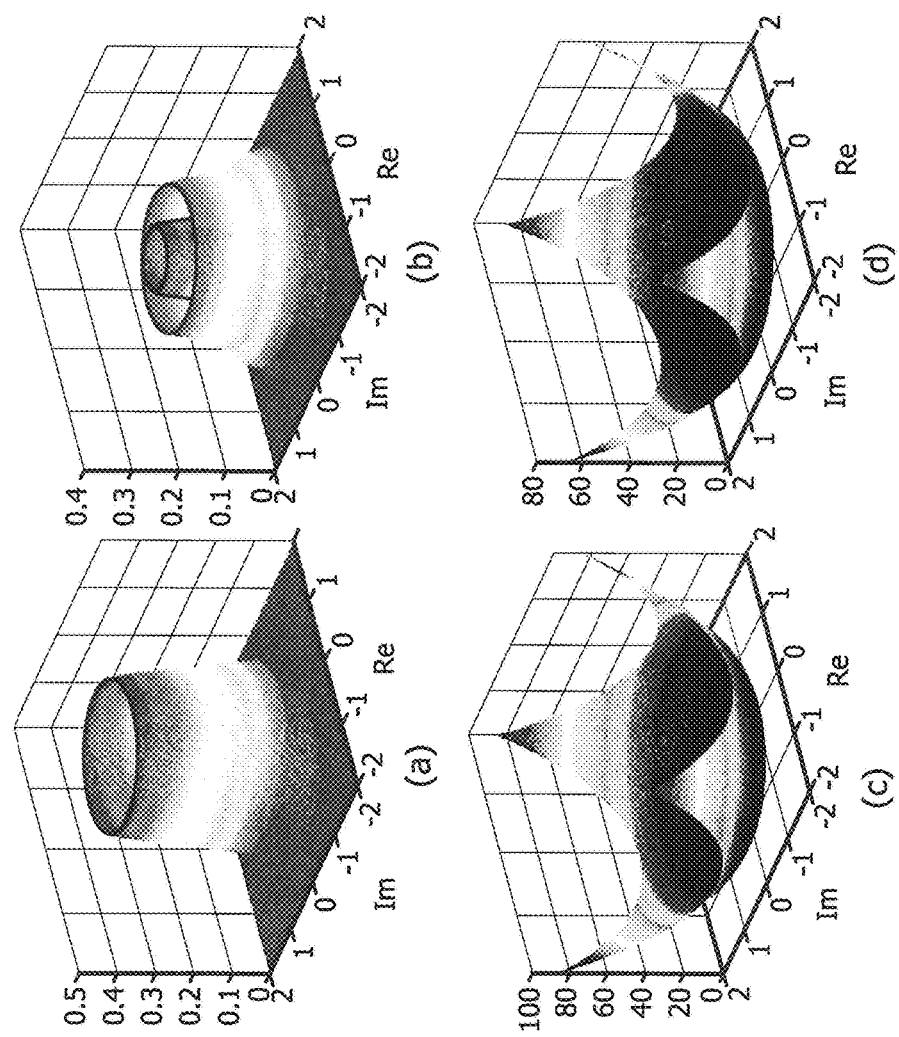
FIG. 2(a) is a PDF of QPSK signal with phase noise and OSNR of 24 dB.
FIG. 2(b) is a PDF of 16QAM signal with phase noise and OSNR of 28 dB.
FIG. 2(c) is a cost function for QPSK.
FIG. 2(d) is a cost function for 16QAM.

As mentioned in Section II, $s=(a+n)e^{j\Phi}$, $n \square N(0,2\sigma^2)$, then the PDF of the unmixed independent component is $$P_s(s) = \frac{1}{M}\sum_{i=1}^{M} p_{s|a_i}(s \mid a_i) \quad (9)$$
$$= \frac{1}{M}\sum_{i=1}^{M} \frac{1}{2\pi\sigma^2}\exp\left(-\frac{|s|^2+|a_i|^2}{2\sigma^2}\right)I_0\left(\left|\frac{a_i^* s}{\sigma^2}\right|\right)$$

where $a_i$ is the complex point in the constellation diagram, and $I_v$ is the $v^{th}$-order modified Bessel function of the first kind. The detailed derivation of $p_s(s)$ is in [21] and the derivation of a from optical signal to noise ratio (OSNR) is presented in Appendix A. The PDF and cost function images of QPSK and 16QAM are shown in FIG. 2. The OSNRs of them are 24 dB and 28 dB, respectively. Because phase noise $\phi$ is uniformly distributed in $[0,2\pi)$, the PDF and the cost functions only rely on the modulus of constellation points. In other words, they are circular symmetric, as can be seen from (9) and FIG. 2.

B. The Gradient Optimization Algorithm

To adaptively calculate the optimal vector w which minimizes the cost function J(w), a gradient optimization method can be employed. The update rule is $$w \leftarrow w + \mu \frac{\partial J(w)}{\partial w^*} \qquad (10)$$
$$w \leftarrow \frac{w}{\sqrt{w^H w}}$$

where $\mu$ is a negative learning rate, the $2^{nd}$ step in the update rule is to guarantee the normality of output.

$$\frac{\partial J(w)}{\partial w^*}$$

is the complex gradient which approaches zero near convergence, and given by $$\frac{\partial J(w)}{\partial w^*} = \frac{1}{2} E\{xg^*(w^H x)\} \qquad (11)$$

The explanation and derivation of complex gradient are in Appendix B. The gradient algorithm can gradually adjust the vector parameters online using the newly updated data. Like other gradient algorithms, it is fit for varying and nonstationary environments, such as fiber PDM channel with PMD interference, but the convergence rate and stability depend on the initial w and learning rate $\mu$.

C. Acceleration Convergence by Quasi-Newton Algorithm

The gradient algorithm has the drawback that it cannot converge rapidly and accurately. Adali proposed a Quasi-Newton algorithm to accelerate its convergence based on the Lagrangian cost function [27]

$$L(w,\lambda) = J(w) + \lambda(w^H w - 1) \qquad (12)$$

The second term of (12) is the constraint condition on w, $\lambda$ is the Lagrange multiplier, and J(w) is defined in (8). Newton algorithm is a $2^{nd}$-order updating rule which converges faster than gradient algorithm. Using complex gradient and Hessian in [31], Newton update can be defined as $$\Delta \vec{w} = -\left(\frac{\partial^2 L}{\partial \vec{w}^* \partial \vec{w}^T}\Big|_{w=w_n}\right)^{-1} \frac{\partial L}{\partial \vec{w}^*}\Big|_{w=w_n} \qquad (13)$$
$$= -\mathbf{H}_L^{-1} \vec{\nabla}_L^*$$
$$= -(\mathbf{H}_J + \lambda I)^{-1}(\vec{\nabla}_J^* + \lambda \vec{w})$$

where $\vec{w} = [w_1, w_1^*, w_2, w_2^*]^T$. With the sophisticated derivation in Appendix C, we obtain the updating rule of Quasi-Newton algorithm:

$$w \leftarrow -\tfrac{1}{2}E\{xg^*(y)\} + E\{g_a(y)\}w + E\{xx^T\}E\{g_b(y)\}w^* \qquad (14)$$

Though the updating rule of Quasi-Newton algorithm is much more complicated than the gradient algorithm, it is immune to the choice of learning rate and converges faster. A practical and feasible choice is that the processor employs the Quasi-Newton algorithm in batch processing mode at the beginning of computing. Once convergence has been achieved, it may turn into a gradient optimization mode to track the variation.

D. Simplification and Approximation

The cost function and update rules of the gradient and Quasi-Newton algorithms, as mentioned above, are rigidly and exactly derived from the PDF of the independent component. However, the complexity of update rules in (10) and (14), whose complete general formulae are in Appendix B & C, almost leads to their infeasibility in real-time receivers. It is necessary to simplify the expressions.

Some approximate nonlinear functions can be substitutes for negentropy [30], because they implicitly introduce some higher-order statistics which can be viewed as measures of non-Gaussianity. A. Hyvärinen have also proved that "any sufficiently smooth even function" can be used as a cost function for ICA by either maximizing or minimizing its value [32]. It is proposed in [33] that the cost function for complex ICA can be defined as $$J(w) = E\{|G(w^H x)|^2\} \qquad (15)$$

where G is a nonlinear function which has to be chosen to match the PDF of independent component. As observed from (8), the PDF matching the cost function in (15) is $$p_G(y) = e^{-|G(y)|^2} \qquad (16)$$

Figure 3:
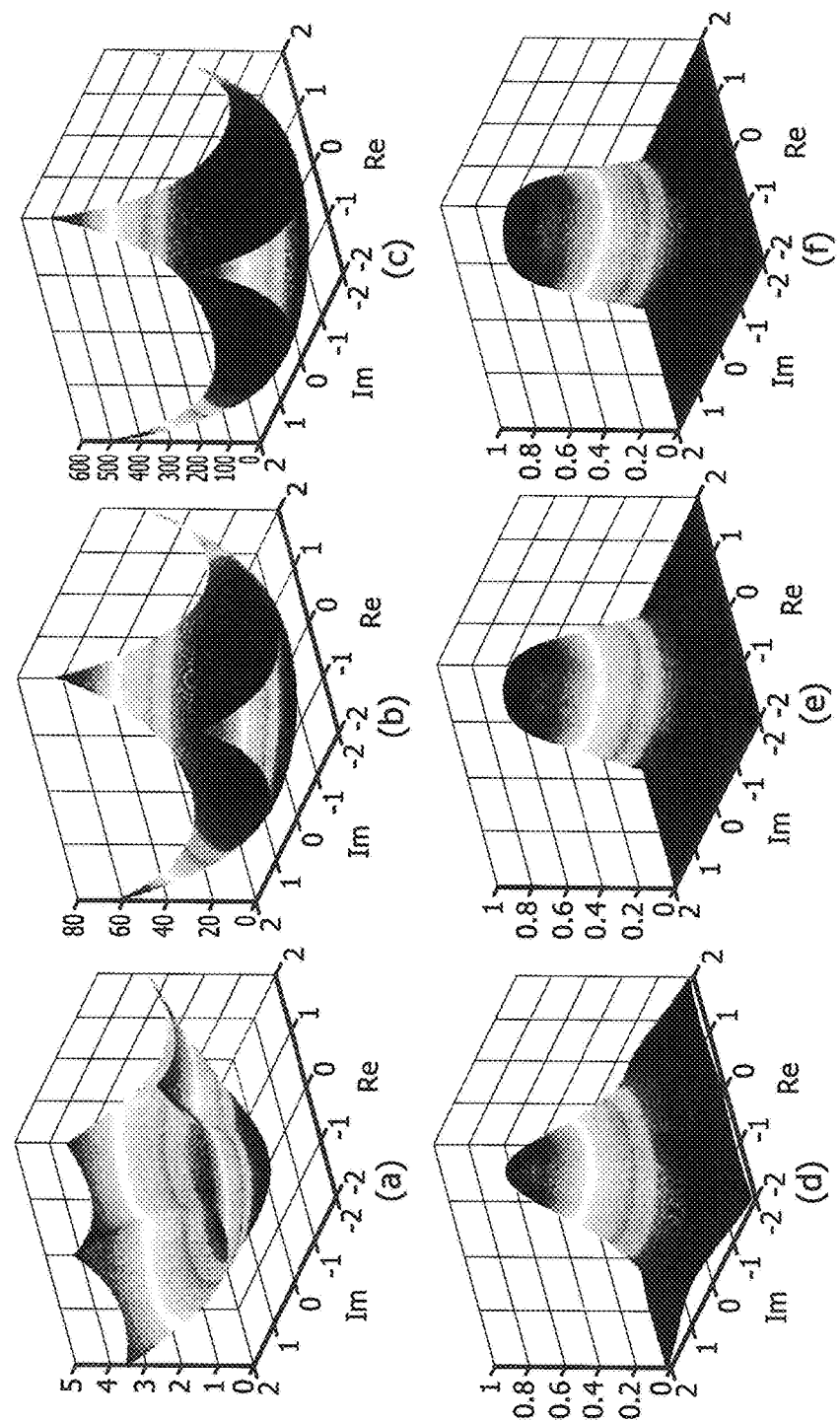
FIG. 3 shows nonlinear functions (a) $|a \sin h(y)|^2$, (b), $|y|^4$ (c) $|y|^6$ and their PDF (d) $e^{-|a \sin h(y)|^2}$, (e) $e^{-|y|^4}$, (f) $e^{-|y|^6}$.

Some nonlinear functions, such as $G_1(y) = a \sin h(y)$, $G_2(y) = y^2$, $G_3(y) = y^3$, along with their associated PDFs are shown in FIG. 3. They are circular symmetric and similar to the actual PDFs and cost functions in FIG. 2, but the cost function $|y|^6$ is excessively sensitive to outliers due to its rapid rate of growth.

The gradient of the cost function in (15) is $$\frac{\partial J(w)}{\partial w^*} = \frac{1}{2} E\{xG^*(y)g(y)\} \qquad (17)$$

and the update rule of the Quasi-Newton algorithm [33] is $$w \leftarrow -E\{G^*(y)g(y)x\} + E\{g(y)g^*(y)\}w + E\{xx^T\}E\{G^*(y)g'(y)\}w^* \qquad (18)$$

where g is the derivative of G and g' is the derivative of g. The low-complexity approximate update rules are suitable for hardware implementation.

E. Calculation of Independent Components on Both Polarizations

The previously discussed algorithms are classified as "one-unit" algorithms which estimate just one of the independent components. To obtain several independent components, a conventional practice is to run one-unit algorithms several times for different weights respectively and then decorrelate them. As for the issue of polarization demultiplexing, this process can be reduced and simplified because the optimized weights $w_1$ and $w_2$ must be orthogonal due to the Jones matrix of fiber transmission in (5), namely, $w_1^H w_2 = 0$. Therefore, once we have estimated one of them, say $w_1$, then $w_2$ can also be calculated without applying the one-unit algorithm again. To calculate a complex vector that is orthogonal to $w_1$, a simple way is to use the Gram-Schmidt orthogonalization algorithm:

$$w_2 = w_0 - w_0 w_0^H w_1 \quad (19)$$

$$w_2 \leftarrow \frac{w_2}{\sqrt{w_2^H w_2}}$$

where $w_0$ is a vector that is orthogonal to the initial $w_1$. The orthogonalization algorithm extracts a vector of the same direction as $w_1$ and leaves the vector $w_2$ that is orthogonal to it. Additionally, it is worthwhile to note that ICA cannot make a distinction between the separated demultiplexing signals, so some special frame header information are needed to identify them.

F. Preprocessing

Before applying an ICA algorithm, it is usually profitable to preprocess the data. The preprocessing is mainly for centering and whitening x, to make x a zero-mean and uncorrelated variable, namely, $E\{x\}=0$ and $E\{xx^H\}=I$. One popular method for whitening is to use eigenvalue decomposition (EVD) of the covariance matrix $E\{xx^H\}$, which leads to very high computation-complexity. The whitening can be achieved adaptively by a gradient algorithm, in which the update rule is $$W \leftarrow W + \mu[I - Wxx^H W^H] \quad (20)$$

Where W is the whitening matrix, Wx is the whited signal, and μ is the convergent rate. A rough interpretation of the rule is that $[I-Wxx^H W^H]$ becomes zero when whitening is achieved at convergence.

Numerical Simulation

A. Convergence of the Algorithms

Figure 4:
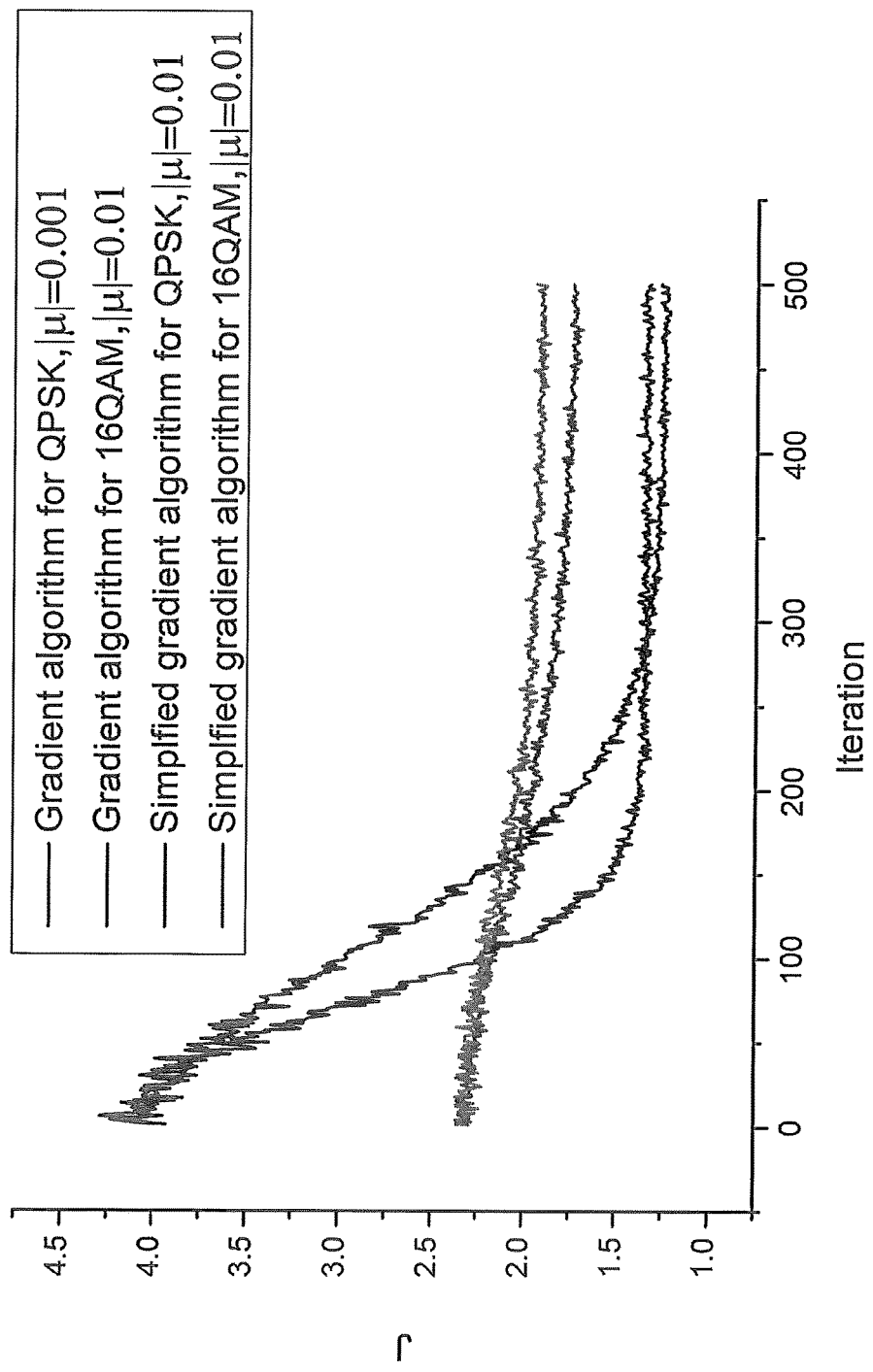
FIG. 4 shows the learning curve of the gradient algorithm.
Figure 5:
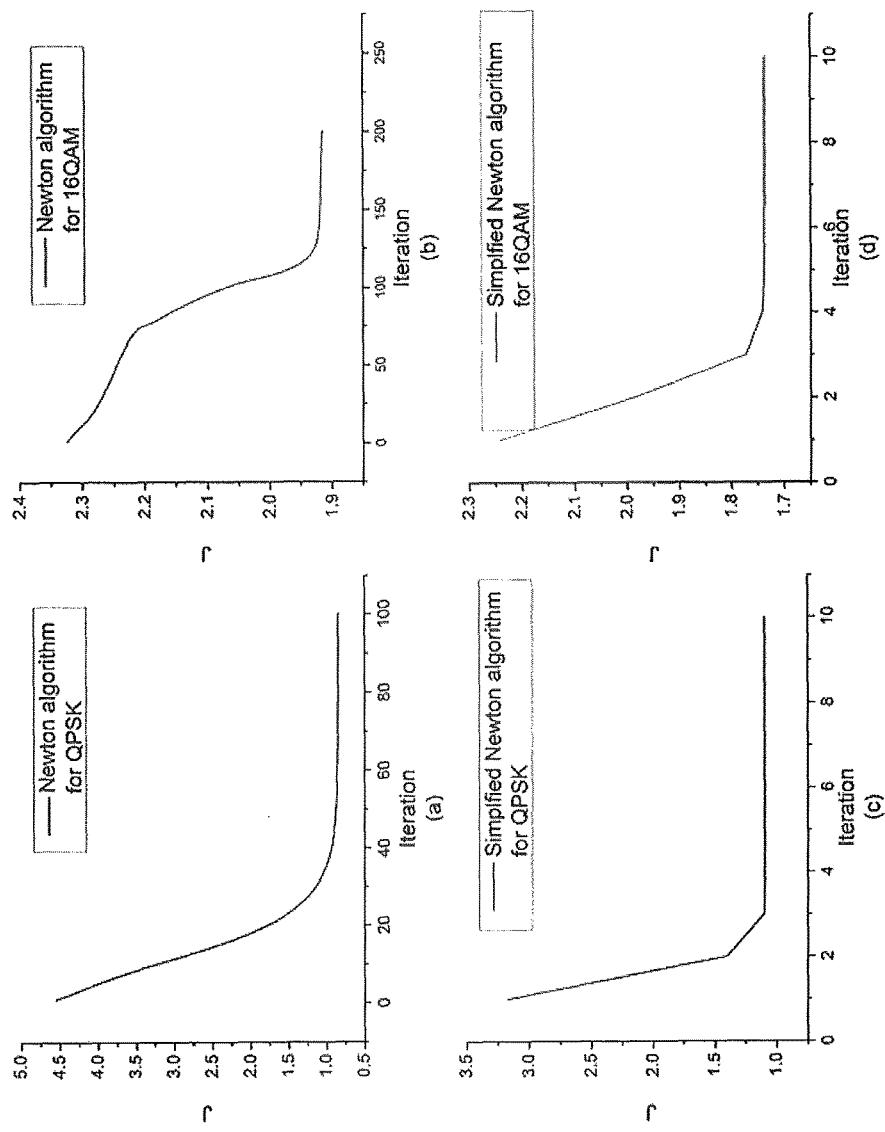
FIGS. 5(a)-(d) show the convergence of the quasi-Newton algorithm.

In order to investigate the convergence of the proposed algorithms, we firstly assume that PDM channel is static, and the parameters in (5) are θ=40°, φ=60°. The OSNRs are set to 18 dB for PDM-QPSK and 24 dB for PDM-16QAM. The convergence depends on the choice of mixing matrix, but the case shown is typical. A uniformly distributed phase noise has also been attached to the symbols. The learning curves of the gradient algorithms and Quasi-Newton algorithms are shown in FIG. 4-5, respectively, which are the arithmetic means of 1000 times simulation. The nonlinear function used here and in the following part of the article is $G_2(y)=y^2$.

The curves in FIG. 4 represent the change of cost functions in (8) derived from the PDF of QPSK and 16QAM signal, which reach steady state after 200~300 iterations. There is a tradeoff between the accuracy and convergent speed, so μ has to be chosen carefully. The curves of the same kind of signal converge in a similar fashion. They almost converge to the minima of their cost functions.

The Quasi-Newton algorithms are in batch processing mode which employs 2000 symbols of both polarizations. The convergence is much faster than the above gradient algorithms as can be seen in the horizontal ordinate in FIG. 5, but the computation complexity is even higher. So we could use the Quasi-Newton algorithms to get close to convergence, and then switch to the gradient algorithm to track it.

B. Dynamic Tracking of the Adaptive Algorithms

Figure 6:
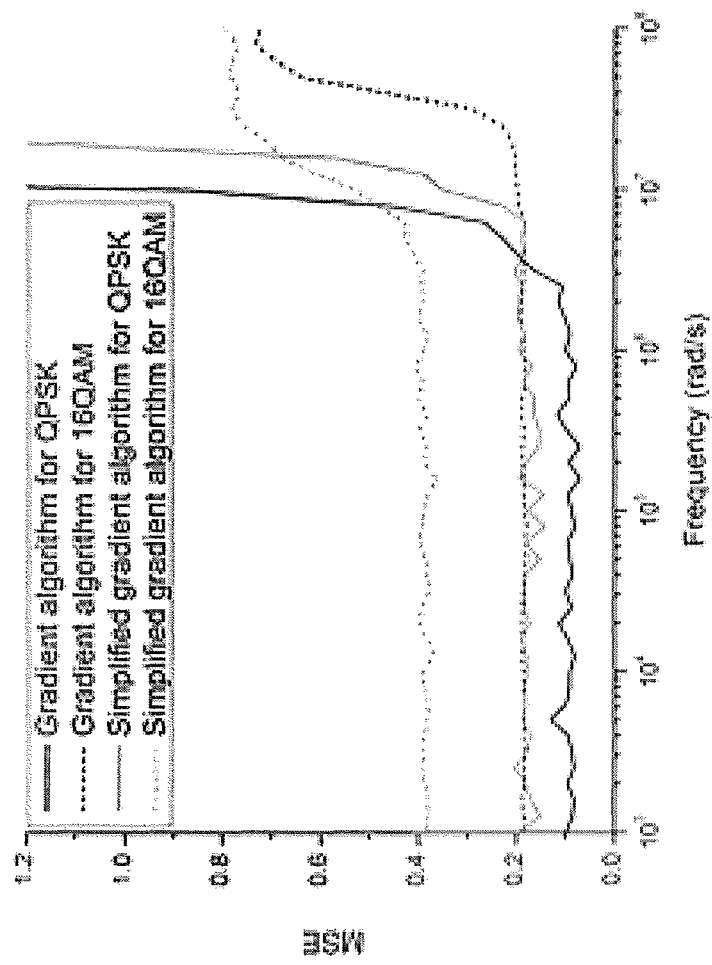
FIG. 6 shows the MSE of average convergent value versus polarization rotation frequency.

In order to gain further insight into the dynamic tracking behavior of the adaptive gradient algorithms, we multiply the channel Jones matrix used in Section IV.A by an endless polarization rotation matrix which is formatted as $$A = \begin{pmatrix} \cos\omega t & \sin\omega t \\ -\sin\omega t & \cos\omega t \end{pmatrix} \quad (21)$$

where ω is the polarization rotation angular frequency. In FIG. 6, MSE refers to the mean square error of the average convergent values relative to the minima of their corresponding cost functions. The average convergent value is also calculated via an arithmetic mean of 1000 times simulation, and the symbol rates of the QPSK and 16QAM signal are supposed to be 28 Gsym/s. Seen from FIG. 6, the four methods can track a polarization rotation frequency less than 10 Mrad/s without significant convergent stability deterioration.

C. Performance in PMD Emulator

Figure 7:
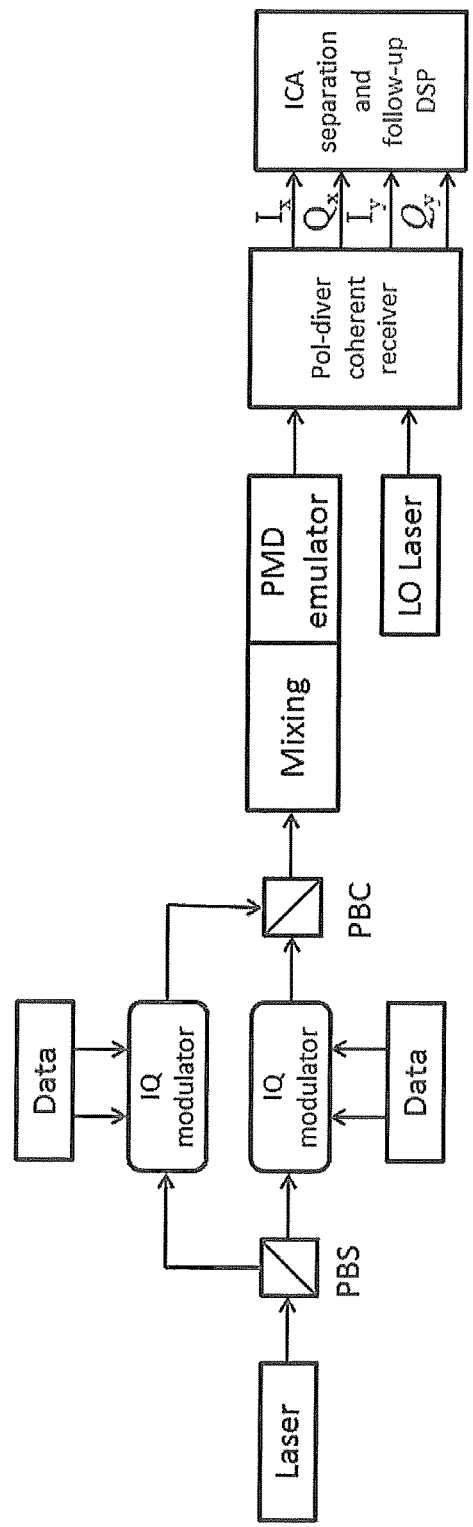
FIG. 7 is a schematic diagram of the simulation system.

The algorithms are tested with a PMD emulator to evaluate the demultiplexing ability in fiber link. In the simulation in FIG. 7, the optical carrier from a laser of 100 kHz line-width is split into two orthogonal polarizations by a polarization beam splitter (PBS). The two I/Q modulators are driven by 28 GSym/s two levels or four levels signal to generate PDM-QPSK or PDM-16QAM signal, the bit rates of which are therefore 107 Gbit/s and 428 Gbit/s, respectively. After that, the two polarizations tributaries are coupled again by a polarization beam coupler (PBC). An instantaneous mixing Jones matrix as in Section IV.A with a concatenated PMD emulator is employed as transmission channel. As mentioned in Section II, CD is neglected, and the PMD emulator is controlled by the mean differential group delays (DGDs) of fiber segments to simulate the effects of the 1st and higher order PMD of real fibers. The OSNRs are the same as before. At the receiver, a polarization-diverse 90° hybrid, along with a local laser of the same 100 kHz line-width are used for coherent detection.

Figure 8:
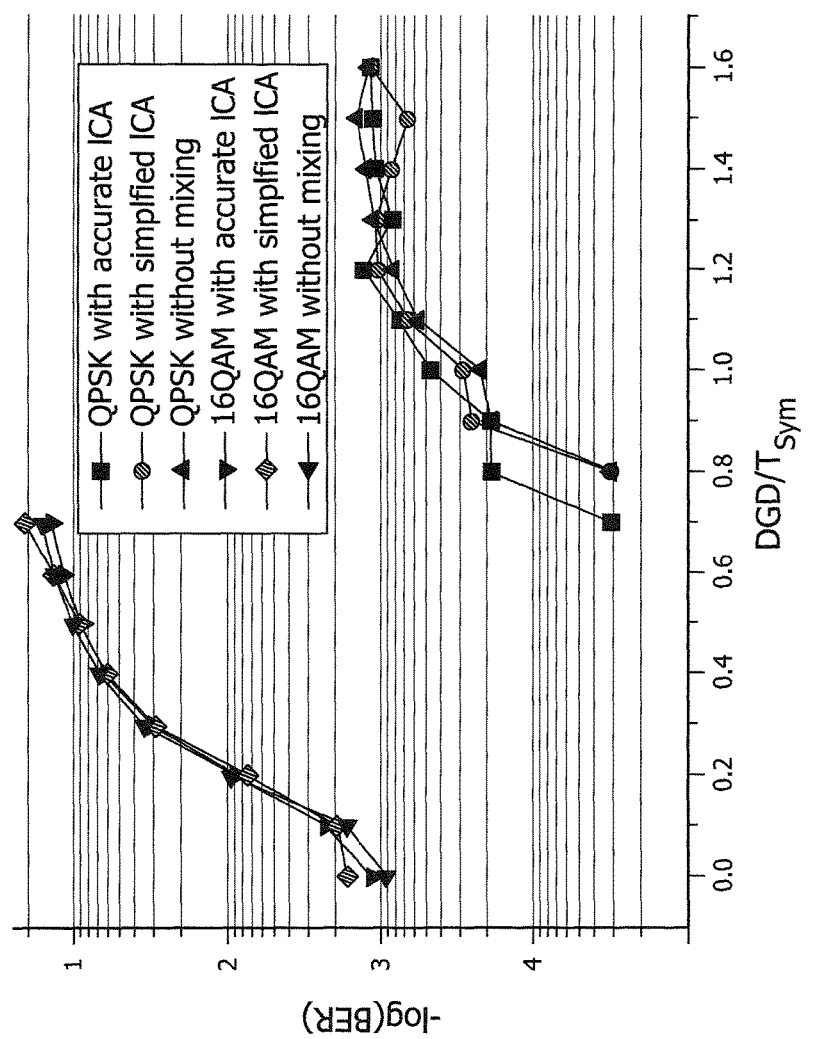
FIG. 8 shows the BER of the mixed and unmixed PDM-QPSK or PDM-16QAM signal versus DGD value.

For every DGD value, BERs (bit error ratios) are measured over 32000 symbols after ICA and follow-up DSP are applied, which includes blind adaptive equalization and phase recovery. The ICA algorithms are implemented in this way: the first 2000 symbols of each polarization are employed for the Quasi-Newton algorithms in a batch processing mode to make the demultiplexing matrix w approach to convergence, and then it switches to the gradient algorithm to track the polarization change adaptively for the rest of the symbols. The results are shown in FIG. 8 with BERs of unmixed signal. No matter which kind of ICA algorithm is applied, the one accurately derived from the signal PDF or the approximate one using nonlinear functions, the results are similar. The coincidence of the curves proves the successful polarization demultiplexing of ICA algorithms and also proves that the simplified ICA algorithms are as effective as the accurate ones even though the computation is greatly reduced.

Figure 9:
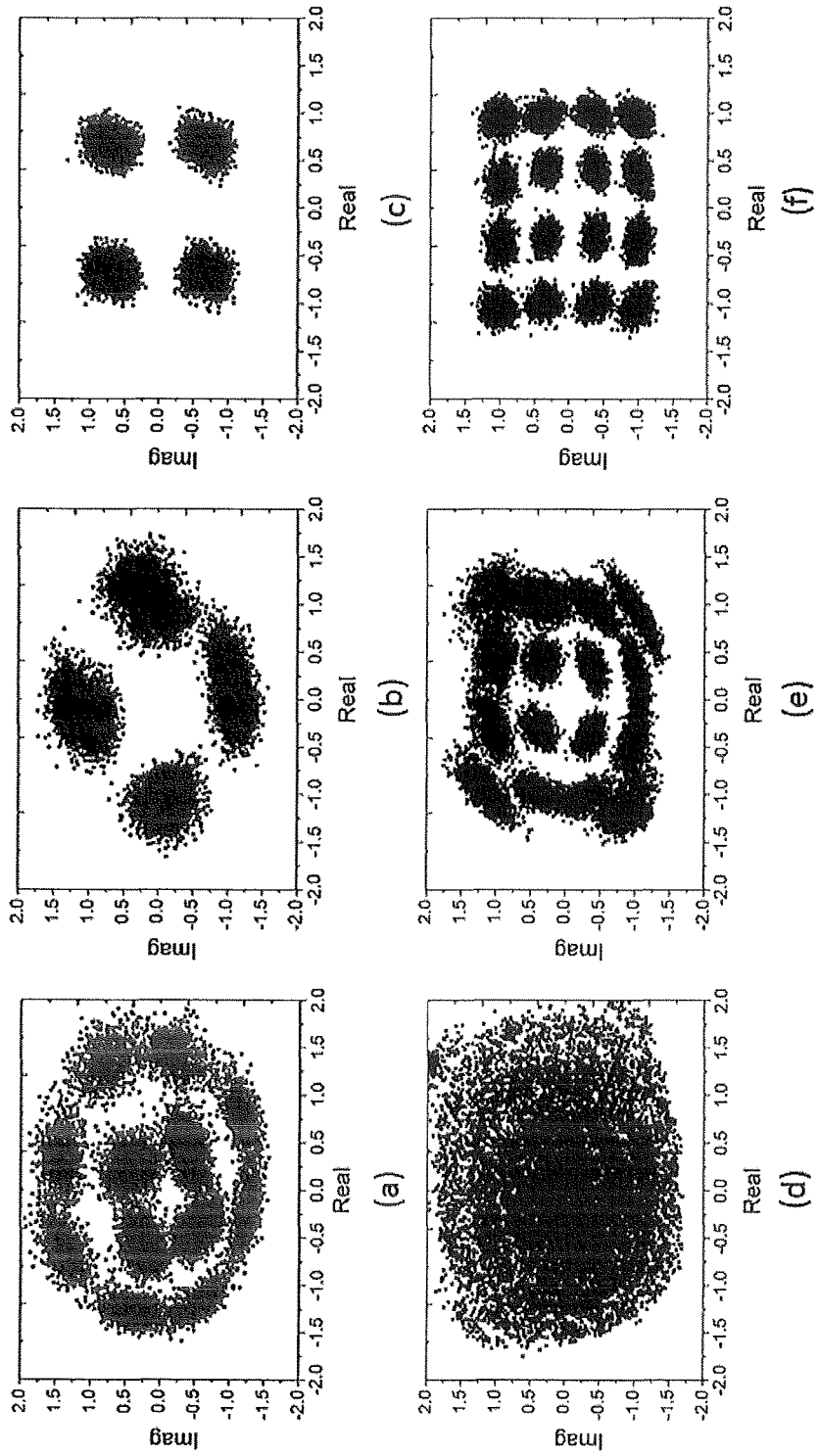
FIGS. 9(a)-(f) show constellations of (a) QPSK before demultiplexing; (b) QPSK after demultiplexing by ICA; (c) QPSK after follow-up DSP; (d) 16QAM before demultiplexing; (e) 16QAM after demultiplexing; and (f) 16QAM after follow-up DSP.

FIG. 9 shows the constellations for the signal before/after applying ICA methods and after finishing all the DSP processing for the case of zero-DGD. The ICA algorithms transfer the signals to their intended moduli.

Experimental Results

Figure 10:
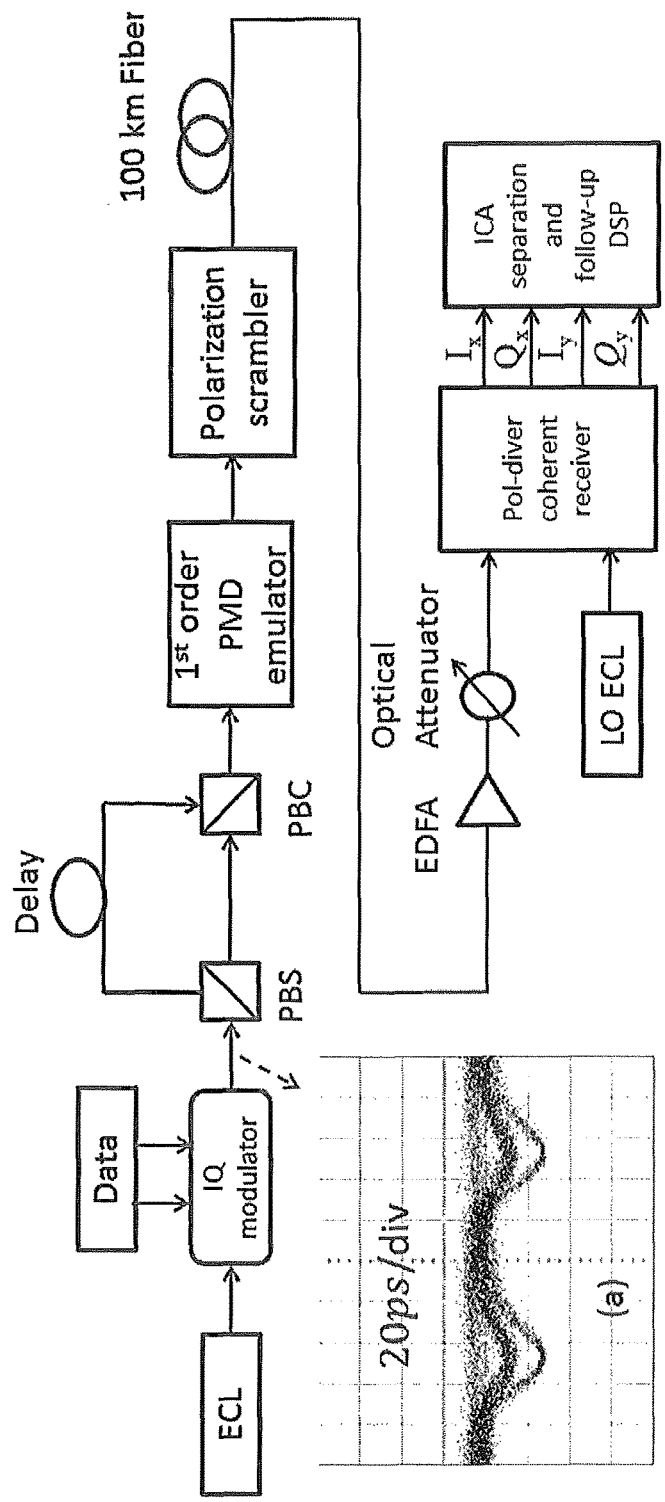
FIG. 10 shows the PDM-QPSK experimental system.

The proposed ICA algorithms are also tested in the experimental system shown in FIG. 10. In the experiment, 40 Gbit/s PDM-QPSK signal is generated by one IQ modulator, a PBS, a PBC and an optical delay line. A $1^{st}$-order PMD emulator and a polarization scrambler are inserted before 100 km standard single mode fiber (SSMF) to ensure that the resulting PMD has all orders. The eye diagram of the generated optical QPSK signal is in FIG. 10(a), and the OSNR of the received optical signal is set to 20 dB by adjusting the EDFA and the optical attenuator.

Figure 11:
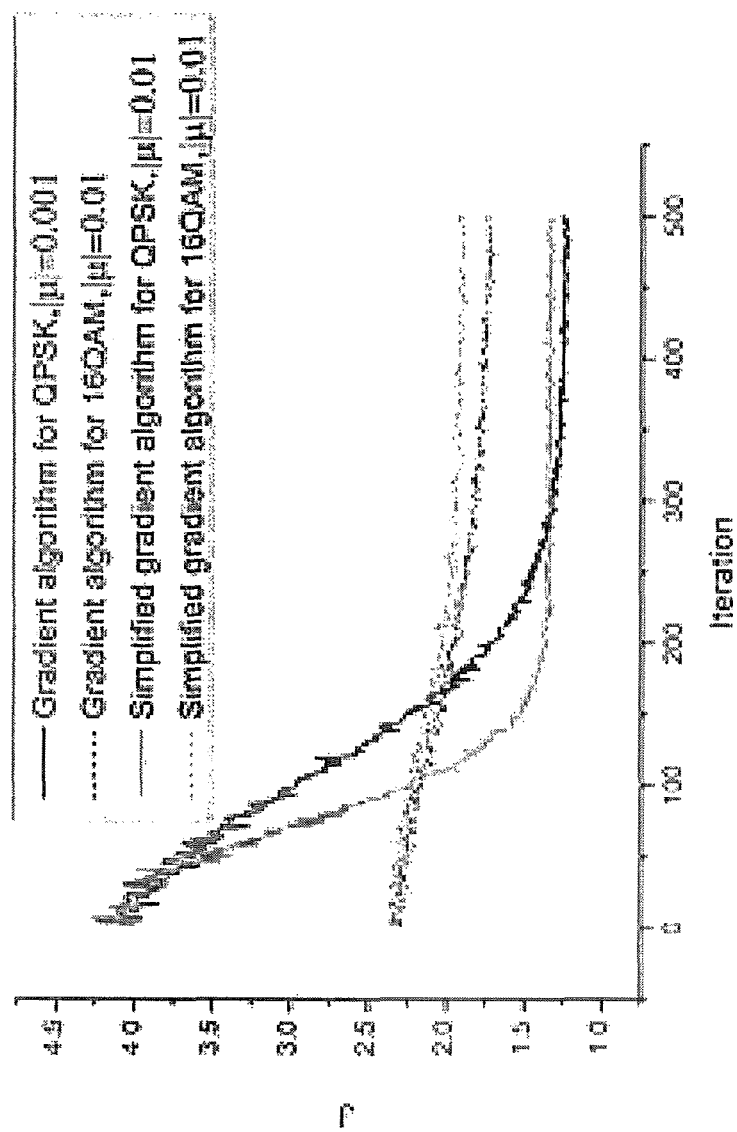
FIG. 11 is an Experiment performance comparison of CMA and ICA with a PMD emulator.

The DSP algorithms for experimental data are identical to those used for the simulation system except that fiber CD compensation is employed. The BERs shown in FIG. 11 are calculated over 40000 bits. The ICA and CMA have similar performance, and this result is coincident with that of [22]. The result reveals that if singularity does not occur, the ICA and CMA are comparable in polarization demultiplexing for PDM-QPSK. Even so, ICA excels CMA, because singularity cannot exist with ICA [21] and ICA is adaptive to other modulation formats.

CONCLUSION

We have derived the polarization demultiplexing algorithms and their simplifications based on ICA by negentropy maximization. It is found that they are effective for coherent detected PDM-QAM signals. It is further shown by experiment that the performance of ICA and CMA for demultiplexing PDM-QPSK is comparable, but ICA has its own advantages of immunity to singularity and modulation format independence. The ICA algorithms can also be potentially applied to eliminate the crosstalk and interferences between sub-channels in the newest spatial-division multiplexing systems which employ multi-core or few-mode fibers.

APPENDIX

A. Derivation of σ from OSNR

The power of noise n can be expressed as $$E(|n|^2) = \int\int |n|^2 p_n(n) dx dy \qquad (22)$$

$$= \int\int \frac{|n_x|^2 + |n_y|^2}{2\pi\sigma^2} \exp\left(-\frac{|n_x|^2 + |n_y|^2}{2\sigma^2}\right) dx dy$$

$$= \int \frac{|n_x|^2}{\sqrt{2\pi}\sigma} \exp\left(-\frac{|n_x|^2}{2\sigma^2}\right) dx \int \frac{|n_y|^2}{\sqrt{2\pi}\sigma} \exp\left(-\frac{|n_y|^2}{2\sigma^2}\right) dy$$

$$= 2\sigma^2$$

Assuming the power of received signal is normalized, so received OSNR is $$OSNR = \frac{E(|a|^2)}{E(|n|^2)} \qquad (23)$$

$$= \frac{1 - E(|n|^2)}{E(|n|^2)}$$

$$= \frac{1 - 2\sigma^2}{2\sigma^2}$$

B. Derivation of Complex Gradient the Cost Function

The complex gradient is derived in detail in [31, 34]. Here we use the results directly. Complex gradient is defined as $$\frac{\partial f}{\partial z} = \frac{1}{2}\left(\frac{\partial f}{\partial z^R} - j\frac{\partial f}{\partial z^I}\right); \qquad (24)$$

$$\frac{\partial f}{\partial z^*} = \frac{1}{2}\left(\frac{\partial f}{\partial z^R} + j\frac{\partial f}{\partial z^I}\right)$$

where $z \in \square$, $z^*$ is the conjugate of $z$ and $f$ is analytic with respect to $z$ and $z^*$ independently. So using the chain rule, we have $$\frac{\partial J(w)}{\partial w_i^*} = \frac{1}{2}E\left\{\frac{\partial\{-\log[p_s(w^H x)]\}}{\partial w_i^R} + j\frac{\partial\{-\log[p_s(w^H x)]\}}{\partial w_i^I}\right\} \qquad (25)$$

$$= \frac{1}{2}E\left\{g^R(y)\frac{\partial(w^H x)^R}{\partial w_i^R} + g^I(y)\frac{\partial(w^H x)^I}{\partial w_i^R} + j\left[g^R(y)\frac{\partial(w^H x)^R}{\partial w_i^I} + g^I(y)\frac{\partial(w^H x)^I}{\partial w_i^I}\right]\right\}$$

$$= \frac{1}{2}E\{g^R(y)x_i^R + g^I(y)x_i^I + j[g^R(y)x_i^I - g^I(y)x_i^R]\}$$

$$= \frac{1}{2}E\{x_i g^*(y)\}, (x_i = x_i^R + jx_i^I, g(y) = g^R(y) + jg^I(y))$$

Thus $$\frac{\partial J(w)}{\partial w^*} = \frac{1}{2}E\{x g^*(w^H x)\} \qquad (26)$$

where $$g^R(y) = -\frac{\partial \log p_s(y)}{\partial y^R} \qquad (27)$$

$$= \frac{-y^R}{M 2\pi\sigma^4 p_s(y)} \sum_{i=1}^{M}\left\{\exp\left(-\frac{|y|^2 + |a_i|^2}{2\sigma^2}\right)\left[I_1\left(\left|\frac{a_i^* y}{\sigma^2}\right|\right)\left|\frac{a_i^*}{y}\right| - I_0\left(\left|\frac{a_i^* y}{\sigma^2}\right|\right)\right]\right\}$$

Similarly, $$g^I(y) = \qquad (28)$$

$$\frac{-y^I}{M 2\pi\sigma^4 p_s(y)} \sum_{i=1}^{M}\left\{\exp\left(-\frac{|y|^2 + |a_i|^2}{2\sigma^2}\right)\left[I_1\left(\left|\frac{a_i^* y}{\sigma^2}\right|\right)\left|\frac{a_i^*}{y}\right| - I_0\left(\left|\frac{a_i^* y}{\sigma^2}\right|\right)\right]\right\}$$

C. Derivation of Updating Rule of Quasi-Newton Algorithm

We start the derivation from (13) and assuming $\Delta \vec{w} = \vec{w}_{n+1} - \vec{w}_n$. We can have $$(\vec{H}_J + \lambda I)\vec{w}_{n+1} = -\vec{\nabla}_J^* + \vec{H}_J \vec{w}_n \qquad (29)$$

$\vec{\nabla}^*_J$ is the complex gradient [31,34], whose odd elements are defined in (11). The complex Hessian $\vec{H}_J$ is given by [27], $$\vec{H}_J = \frac{\partial^2 J(w)}{\partial \vec{w}^* \partial \vec{w}^T} \qquad (30)$$

$$= \begin{bmatrix} \frac{\partial^2 J(w)}{\partial w_1^* \partial w_1} & \frac{\partial^2 J(w)}{\partial w_1^* \partial w_1^*} & \frac{\partial^2 J(w)}{\partial w_1^* \partial w_2} & \frac{\partial^2 J(w)}{\partial w_1^* \partial w_2^*} \\ \frac{\partial^2 J(w)}{\partial w_1 \partial w_1} & \frac{\partial^2 J(w)}{\partial w_1 \partial w_1^*} & \frac{\partial^2 J(w)}{\partial w_1 \partial w_2} & \frac{\partial^2 J(w)}{\partial w_1 \partial w_2^*} \\ \frac{\partial^2 J(w)}{\partial w_2^* \partial w_1} & \frac{\partial^2 J(w)}{\partial w_2^* \partial w_1^*} & \frac{\partial^2 J(w)}{\partial w_2^* \partial w_2} & \frac{\partial^2 J(w)}{\partial w_2^* \partial w_2^*} \\ \frac{\partial^2 J(w)}{\partial w_2 \partial w_1} & \frac{\partial^2 J(w)}{\partial w_2 \partial w_1^*} & \frac{\partial^2 J(w)}{\partial w_2 \partial w} & \frac{\partial^2 J(w)}{\partial w_2 \partial w_2^*} \end{bmatrix}$$

-continued $$= E\left\{g_a(y)\begin{bmatrix} x_1x_1^* & 0 & x_1x_2^* & 0 \\ 0 & x_1^*x_1 & 0 & x_1^*x_2 \\ x_2x_1^* & 0 & x_2x_2^* & 0 \\ 0 & x_2^*x_1 & 0 & x_2^*x_2 \end{bmatrix}\right\} +$$

$$E\left\{\begin{bmatrix} 0 & x_1^2g_b(y) & 0 & x_1x_2g_b(y) \\ x_1^{*2}g_b^*(y) & 0 & x_1^*x_2^*g_b^*(y) & 0 \\ 0 & x_2x_1g_b(y) & 0 & x_2^2g_b(y) \\ x_2^*x_1^*g_b^*(y) & 0 & x_2^{*2}g_b^*(y) & 0 \end{bmatrix}\right\}$$

where $$g_a(y) = 4\left[\frac{\partial g^R(y)}{\partial y^R} + \frac{\partial g^I(y)}{\partial y^I} + j\left(\frac{\partial g^R(y)}{\partial y^I} - \frac{\partial g^I(y)}{\partial y^R}\right)\right] \quad (31)$$

$$= \frac{8g(y)}{y} + \frac{2h(y)|y|^2}{\pi\sigma^2}$$

$$g_b(y) = 4\left[\frac{\partial g^R(y)}{\partial y^R} - \frac{\partial g^I(y)}{\partial y^I} + j\left(\frac{\partial g^R(y)}{\partial y^I} + \frac{\partial g^I(y)}{\partial y^R}\right)\right]$$

$$= \frac{2h(y)[(y^R)^2 - (y^I)^2 + j2y^Ry^I]}{\pi\sigma^4}$$

$$h(y) = \quad (32)$$

$$\frac{1}{Mp_s(y)}\sum_{i=1}^{M}\left\{\exp\left(-\frac{|y|^2 + |a_i|^2}{2\sigma^2}\right)\left[\left(\left|\frac{a_i}{\sigma y}\right|^2 + \frac{1}{\sigma^2} - \frac{g(y)}{y}\right)I_0\left(\left|\frac{a_iy}{\sigma^2}\right|\right) - \left|\frac{2a_i}{y}\right|\left(\frac{1}{|y|^2} + \frac{1}{\sigma^2} - \frac{g(y)}{2y}\right)I_1\left(\left|\frac{a_iy}{\sigma^2}\right|\right)\right]\right\}$$

Assuming x has been whitened, and after removing the even rows of the matrix $\mathbf{H}_J$ and $\mathbf{w}_J^*$, it results in $$(H_J + \lambda I)w_{n+1} = -\frac{1}{2}E\{xg^*(y)\} + E\{xx^Hg_a(y)\}w_n + E\{xx^Tg_b(y)\}w_n^* \approx \quad (33)$$

$$-\frac{1}{2}E\{xg^*(y)\} + E\{g_a(y)\}w_n + E\{xx^T\}E\{g_b(y)\}w_n^*$$

At the convergent point, $(\mathbf{H}_J+\lambda\tilde{I})$ will become real, as proved in [27]. Therefore, the fix-point update is $$w \leftarrow -\frac{1}{2}E\{xg^*(y)\} + E\{g_a(y)\}w + E\{xx^T\}E\{g_b(y)\}w^* \quad (34)$$

REFERENCES

[1] X. Zhou, et al., "High Spectral Efficiency 400 Gb/s Transmission Using PDM Time-Domain Hybrid 32-64 QAM and Training-Assisted Carrier Recovery," IEEE/OSA Journal of Lightwave Technology, vol. 31, pp. 999-1005, 2013.
[2] J. Yu, et al., "Transmission of 200 G PDM-CSRZ-QPSK and PDM-16 QAM With a SE of 4 b/s/Hz," IEEE/OSA Journal of Lightwave Technology, vol. 31, pp. 515-522, 2013.
[3] P. J. Winzer, "High-Spectral-Efficiency Optical Modulation Formats," IEEE/OSA Journal of Lightwave Technology, vol. 30, pp. 3824-3835, 2012.
[4] M. Yiran, Y. Qi, T. Yan, C. Simin, and W. Shieh, "1-Tb/s Single-Channel Coherent Optical OFDM Transmission With Orthogonal-Band Multiplexing and Subwavelength Bandwidth Access," IEEE/OSA Journal of Lightwave Technology, vol. 28, pp. 308-315, 2010.
[5] Y. Ma, Q. Yang, Y. Tang, S. Chen, and W. Shieh, "1-Tb/s single-channel coherent optical OFDM transmission over 600-km SSMF fiber with subwavelength bandwidth access," OSA Optics Express, vol. 17, pp. 9421-9427, 2009.
[6] X. Yuan, J. Zhang, Q. Jing, Y. Zhang, and M. Zhang, "A novel scheme for automatic polarization division demultiplexing," in Proc. Asia Communications and Photonics Conference and Exhibition (ACP), 2011, pp. 83092P.
[7] A.-L. Yi, L.-S. Yan, J. Ye, W. Pan, B. Luo, and X. S. Yao, "A Novel Scheme for All-Optical Automatic Polarization Division Demultiplexing," in Proc. Asia Communications and Photonics Conference and Exhibition (ACP), 2009, pp. TuAA1.
[8] X. S. Yao, L. S. Yan, B. Zhang, A. E. Willner, and J. Jiang, "All-optic scheme for automatic polarization division demultiplexing," OSA Optics Express, vol. 15, pp. 7407-7414, 2007.
[9] Z. Yu, X. Yi, Q. Yang, M. Luo, J. Zhang, L. Chen, et al, "Polarization demultiplexing in stokes space for coherent optical PDM-OFDM," OSA Optics Express, vol. 21, pp. 3885-3890, 2013.
[10] C. Gong, X. Wang, N. Cvijetic, and G. Yue, "A Novel Blind Polarization Demultiplexing Algorithm Based on Correlation Analysis," IEEE/OSA Journal of Lightwave Technology, vol. 29, pp. 1258-1264, 2011.
[11] B. Szafraniec, B. Nebendahl, and T. Marshall, "Polarization demultiplexing in Stokes space," OSA Optics Express, vol. 18, pp. 17928-17939, 2010.
[12] L. Ling, T. Zhenning, Y. Weizhen, S. Oda, T. Hoshida, and J. C. Rasmussen, "Initial tap setup of constant modulus algorithm for polarization de-multiplexing in optical coherent receivers," in Proc. Optical Fiber Communication Conference and Exposition and the National Fiber Optic Engineers Conference (OFC/NFOEC), 2009, pp. 1-3.
[13] A. Vgenis, C. S. Petrou, C. B. Papadias, I. Roudas, and L. Raptis, "Nonsingular Constant Modulus Equalizer for PDM-QPSK Coherent Optical Receivers," IEEE Photonics Technology Letters, vol. 22, pp. 45-47, 2010.
[14] K. Kikuchi, "Polarization-demultiplexing algorithm in the digital coherent receiver," in Digest of the IEEE/LEOS Summer Topical Meetings, 2008, pp. 101-102.
[15] X. Zhou and J. Yu, "Digital signal processing for coherent optical communication," in Proc. 18th Annual Wireless and Optical Communications Conference (WOCC), 2009, pp. 1-5.
[16] O. Zia-Chahabi, R. Le Bidan, C. Laot, and M. Morvan, "A self-reconfiguring constant modulus algorithm for proper polarization demultiplexing in coherent optical receivers," in Proc. Optical Fiber Communication Conference and Exposition (OFC/NFOEC), 2012 and the National Fiber Optic Engineers Conference, 2012, pp. 1-3.
[17] I. Roudas, A. Vgenis, C. S. Petrou, D. Toumpakaris, J. Hurley, M. Sauer, et al, "Optimal Polarization Demultiplexing for Coherent Optical Communications Systems," IEEE/OSA Journal of Lightwave Technology, vol. 28, pp. 1121-1134, 2010.
[18] S. J. Savory, "Digital Coherent Optical Receivers: Algorithms and Subsystems," IEEE Journal of Selected Topics in Quantum Electronics, vol. 16, pp. 1-16, 2010.

[19] Y. Han and G. Li, "Coherent optical communication using polarization multiple-input-multiple-output," OSA Optics Express, vol. 13, pp. 7527-7534, 2005.

[20] C. C. Do, C. Zhu, A. V. Tran, S. Chen, T. Anderson, D. Hewitt, et al., "Chromatic dispersion estimation in 40 Gb/s coherent polarization-multiplexed single carrier system using complementary Golay sequences," in Proc. Optical Fiber Communication Conference and Exposition and the National Fiber Optic Engineers Conference(OFC/NFOEC), 2012, pp. 1-3.

[21] Pontus. Johannisson, Henk. Wymeersch, Martin. Sjodin, A. Serdar Tan, et al, "Convergence Comparison of the CMA and ICA for Blind Polarization Demultiplexing," IEEE/OSA Journal of Optical Communications and Networking, vol. 3, pp. 493-501, 2011.

[22] H. Zhang, Z. Tao, L. Liu, S. Oda, T. Hoshida, and J. C. Rasmussen, "Polarization demultiplexing based on independent component analysis in optical coherent receivers," in Proc. 34th European Conference on Optical Communication (ECOC) 2008, pp. 1-2.

[23] X. Xiaobo, F. Yaman, Z. Xiang, and L. Guifang, "Polarization Demultiplexing by Independent Component Analysis," IEEE Photonics Technology Letters, vol. 22, pp. 805-807, 2010.

[24] T. Oktem, A. T. Erdogan, and A. Demir, "Adaptive Receiver Structures for Fiber Communication Systems Employing Polarization-Division Multiplexing," IEEE/OSA Journal of Lightwave Technology, vol. 27, pp. 5394-5404, 2009.

[25] Turgut M. Öktem, Alper T. Erdogan, and Alper Demir, "Adaptive Receiver Structures for Fiber Communication Systems Employing Polarization Division Multiplexing: High Symbol Rate Case," IEEE/OSA Journal of Lightwave Technology, vol. 28, pp. 1536-1546, 2010.

[26] I. B. Djordjevic, "Spatial-Domain-Based Hybrid Multidimensional Coded-Modulation Schemes Enabling Multi-Tb/s Optical Transport," IEEE/OSA Journal of Lightwave Technology, vol. 30, pp. 2315-2328, 2012.

[27] M. Novey and T. Adali, "Complex ICA by Negentropy Maximization," IEEE Transactions on Neural Networks, vol. 19, pp. 596-609, 2008.

[28] M. Novey and T. Adali, "Complex Fixed-Point ICA Algorithm for Separation of QAM Sources using Gaussian Mixture Model," in Proc. IEEE International Conference on Acoustics, Speech and Signal Processing (ICASSP), 2007, pp. 11-445-11-448.

[29] P. K. A. Wai, C. R. Menyuk, and H. H. Chen, "Stability of solitons in randomly varying birefringent fibers," Optics. Letters, vol. 16, pp. 1231-1233, 1991.

[30] A. Hyvarinen and E. Oja, "Independent component analysis: algorithms and applications," Neural Networks, vol. 13, pp. 411-430, 2000.

[31] A. van den Bos, "Complex gradient and Hessian," IEE Proceedings—Vision, Image and Signal Processing, vol. 141, pp. 380-383, 1994.

[32] E. Bingham and A. Hyvarinen, "A fast fixed-point algorithm for independent component analysis of complex valued signals," International Journal of Neural Systems, vol. 10, pp. 1-8, 2000.

[33] T. Adali, L. Hualiang, M. Novey, and J. F. Cardoso, "Complex ICA Using Nonlinear Functions," IEEE Transactions on Signal Processing, vol. 56, pp. 4536-4544, 2008.

[34] D. H. Brandwood, "A complex gradient operator and its application in adaptive array theory," IEE Proceedings H-Microwaves, Optics and Antennas, vol. 130, pp. 11-16, 1983.

The invention claimed is:

1. A method for polarization demultiplexing in an optical system for maximizing a signal's non-Gaussianity using independent component analysis, wherein the non-Gaussianity is measured by negentropy based on information quantity of differential entropy, the method comprising:
receiving an optical beam containing the signal;
generating a local laser beam;
coherently detecting the signal using the local laser beam;
employing an optimal cost function in a processor;
employing a quasi-Newton update algorithm in the processor until the algorithm converges; and
thereafter employing a gradient optimization update algorithm to track signal variation, to minimize the optimal cost function in the processor,
wherein the negentropy is characterized by the probability density function (PDF) of the signal, and the minimizing the cost function includes substituting the PDF with a nonlinear function.

2. The method of claim 1, wherein the optimal cost function is $J(w)=E\{-\log[p_s(w^H x)]\}$ or $J(w)=E\{|G(w^H x)|^2\}$.

3. The method of claim 2, wherein a probability density function matching the cost function is $p_G(y)=e^{-|G(y)|^2}$.

4. The method of claim 1, wherein the gradient optimization update algorithm is $$w \leftarrow w + \mu \frac{\partial J(w)}{\partial w^*}$$

$$w \leftarrow \frac{w}{\sqrt{w^H w}}.$$

5. The method of claim 1, wherein the gradient optimization update algorithm gradually adjusts vector parameters using newly updated data.

6. The method of claim 1, wherein the quasi-Newton update algorithm is $$w \leftarrow -\frac{1}{2}E\{xg^*(y)\} + E\{g_a(y)\}w + E\{xx^T\}E\{g_b(y)\}w^*.$$

7. The method of claim 1, wherein the Quasi-Newton update algorithm is employed by the processor in a batch processing mode.

8. The method of claim 1, further comprising running a one-unit algorithm a plurality of times for different weights respectively; and decorrelating the results of one-unit algorithm, wherein a plurality of independent components are obtained.

9. The method of claim 1, further comprising employing unique frame headers to identify separated signals.

10. The method of claim 1, further comprising preprocessing data for whitening.

11. The method of claim 10, wherein the preprocessing includes using eigenvalue decomposition.

12. The method of claim 10, wherein the preprocessing is achieved adaptively by a gradient algorithm.

13. An optical system for maximizing a signal's non-Gaussianity using independent component analysis, wherein the non-Gaussianity is measured by negentropy based on information quantity of differential entropy, the optical system comprising a transmitter and a receiver,
- wherein the transmitter includes a laser and transmits a signal over a fiber optic medium using the laser,
- wherein the receiver carries out steps comprising:
  - receiving an optical beam containing the signal;
  - generating a local laser beam;
  - coherently detecting the signal using the local laser beam;
  - employing an optimal cost function;
  - employing on the signal a quasi-Newton update algorithm until the algorithm converges;
  - employing after the quasi-Newton update algorithm a gradient optimization update algorithm to minimize the optimal cost function; and
  - running a one-unit algorithm a plurality of times for different weights respectively and decorrelating the results, wherein a plurality of independent components are obtained.

14. The optical system of claim 13, wherein the receiver carries out further steps comprising employing unique frame headers to identify separated signals.

15. The optical system of claim 13, wherein the receiver carries out further steps comprising preprocessing data for whitening.

* * * * *